United States Patent [19]

George

[11] 4,370,456

[45] Jan. 25, 1983

[54] CATALYST COMPOSITION FOR COPOLYMERIZING ETHYLENE

[75] Inventor: Kathleen F. George, Crosslanes, W. Va.

[73] Assignee: Union Carbide Corporation, Danbury, Conn.

[21] Appl. No.: 324,075

[22] Filed: Nov. 23, 1981

[51] Int. Cl.$^3$ .................. C08F 4/02; C08F 10/02
[52] U.S. Cl. .................. 526/125; 252/429 B; 526/348.6; 526/901
[58] Field of Search .................. 252/429 B; 526/125

[56] References Cited

U.S. PATENT DOCUMENTS 4,302,566 11/1982 Karol et al. .................. 526/125
4,308,369 12/1981 Shipley et al. .................. 526/125

FOREIGN PATENT DOCUMENTS 4647 10/1979 European Pat. Off. .

Primary Examiner—Edward J. Smith
Attorney, Agent, or Firm—John S. Piscitello

[57] ABSTRACT

Ethylene copolymers having improved resistance to pinstriping and gel streaking when extruded into film can be produced by continuously copolymerizing ethylene with one or more higher alpha olefin monomers in a low pressure gas phase reaction with a catalyst composition prepared by forming a precursor composition from a magnesium compound, titanium compound, and electron donor compound; diluting said precursor composition with a silica support which has been treated with a dialkylzinc compound; and activating the diluted precursor composition with an organoaluminum compound.

38 Claims, 1 Drawing Figure

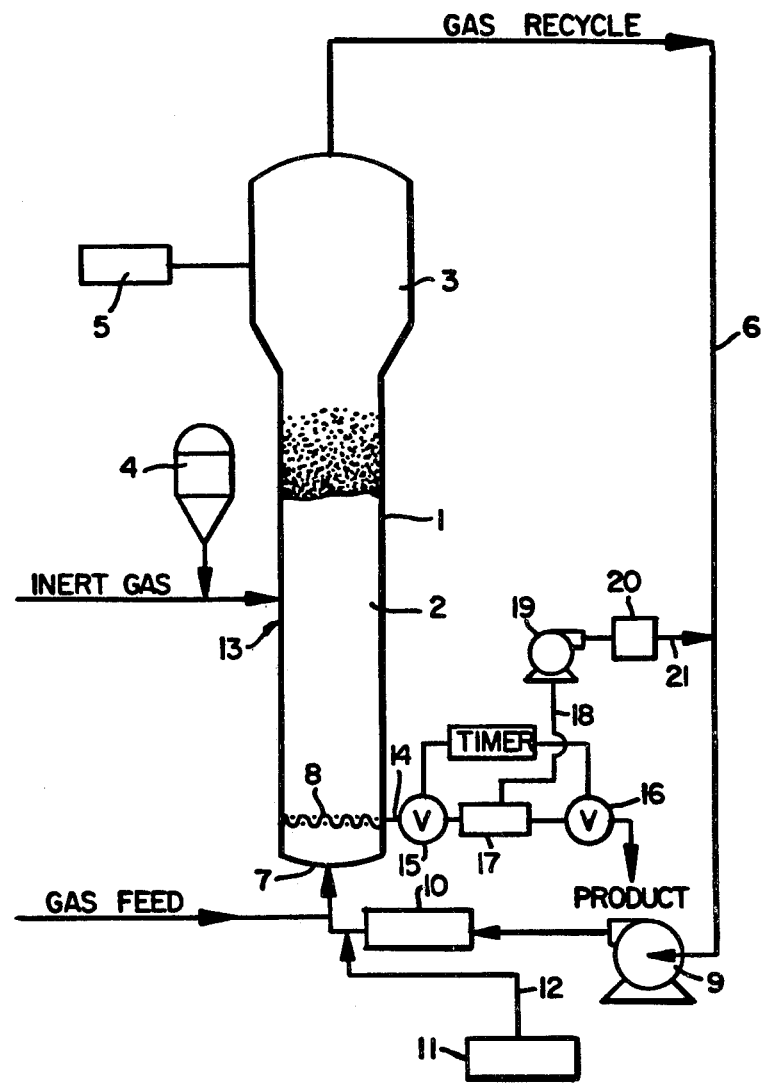

CATALYST COMPOSITION FOR COPOLYMERIZING ETHYLENE

FIELD OF THE INVENTION

This invention relates to an improved process for copolymerizing ethylene with other alpha olefins to produce copolymers characterized by improved resistance to pinstriping and gel streaking when extruded into film.

BACKGROUND OF THE INVENTION

Ethylene copolymers having excellent optical properties in film form can be prepared, as described in European patent publication No. 4647, by continuously copolymerizing ethylene with one or more higher alpha olefin monomers via a low pressure gas phase reaction with a catalyst composition prepared by (1) forming a precursor composition from a magnesium compound, titanium compound and electron donor compound, (2) impregnating said precursor composition in a particulate, inert, porous support, and (3) activating the precursor composition with an organoaluminum compound. While films formed from such copolymers generally have good clarity, they are characterized by visual imperfections known as "pinstriping" and "gel streaking". By "pinstriping" is meant haze bands which are produced when the copolymer is extruded into film as accumulations of polymeric micro-gels in the copolymer are aligned in the film by the shear forces exerted during the extrusion. By "gel streaking" is meant lineations in the surface of the film, sometimes having a V or chevron shape, which are caused by the flow of polymeric gels into the molten polymer surface during extrusion. In extreme cases, these lineations can completely permeate the film. Both these phenomena not only detract from the appearance of the film, but also weaken the mechanical strength of the film.

Both pinstriping and gel streaking are known to result from the presence of polymeric gels in the copolymers. Such gels usually develop during processing of the copolymers into film. In order to prevent undesirable polymer degradation during such processing, as well as during storage, it is common to add a hindered phenolic anti-oxidant to the copolymers before attempting to extrude them into film. However, at processing temperatures of about 210° C. or above, residual halogen from the catalyst employed in the preparation of the copolymers reacts with copolymer melt to produce hydrogen halide gas, which hydrogen halide gas in turn interacts with the phenolic anti-oxidant and the copolymer. This latter reaction produces the gel formation which is responsible for the pinstriping and gel streaking effects created when the copolymer is extruded into film.

In addition to producing films characterized by pinstriping and gel streak defects, it has been found that the copolymers produced as described in European patent publication No. 4647 often cause corrosion of the molding and extrusion equipment employed to process them. This corrosion results from the liberation of hydrogen halide gas during processing of the copolymers at temperatures of 210° C. or more.

SUMMARY OF THE INVENTION

In accordance with the present invention, it has now been discovered that ethylene copolymers having improved resistance to pinstriping and gel streaking when extruded into film, and which are less corrosive to conventional molding and extrusion equipment employed to process them at elevated temperatures (e.g., above 210° C.), can be produced by continuously copolymerizing ethylene with one or more higher alpha olefin monomers in a low pressure gas phase reaction with a catalyst composition prepared by forming a precursor composition from a magnesium compound, titanium compound, and electron donor compound; diluting said precursor composition with a silica support which has been treated with a dialkylzinc compound; and activating the diluted precursor composition with an organo aluminum compound.

BRIEF DESCRIPTION OF THE DRAWING

The drawing shows a gas phase fluid bed reactor system in which the catalyst system of the present invention may be employed.

DESCRIPTION OF THE PREFERRED EMBODIMENT

In addition to being processible into films having a reduced incidence of pinstriping and gel streaking, and being less corrosive to molding and extrusion equipment employed to process them, the copolymers produced in accordance with the present invention are characterized by excellent mechanical properties as well. In order to obtain the desired copolymers, however, it is essential that the catalyst composition employed in their production be diluted with a silica support which has been treated with a dialkylzinc compound.

Ethylene Polymers

The ethylene copolymers produced with the catalyst compositions of the present invention have a density of from about 0.91 g/cm$^3$ to about 0.94 g/cm$^3$, preferably from 0.916 g/cm$^3$ to 0.925 g/cm$^3$. At a given melt index, the density of the copolymers is primarily regulated by the amount of comonomer which is copolymerized with the ethylene. In the absence of comonomer, ethylene polymerizes to form homopolymers having a density of at least about 0.96 g/cm$^3$. By the addition of progressively larger amounts of comonomer, copolymers having a progressively lower density are obtained. The amount of comonomer needed to achieve the same result will vary from comonomer to comonomer, under the same conditions. Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The copolymers produced with the catalyst compositions of the present invention are copolymers of a major mol percent (at least 90%) of ethylene and a minor mol percent (no more than 10%) of one or more alpha olefins containing from 3 to 8 carbon atoms. These alpha olefins, which should not contain any branching on any of their carbon atoms which is closer than the fourth carbon atom, include propylene, butene-1, pentene-1, hexene-1, 4-methylpentene-1, heptene-1 and octene-1. The preferred alpha olefins are propylene, butene-1, hexene-1, 4-methylpentene-1 and octene-1.

The copolymers produced with the catalyst compositions of the present invention have a standard or normal load melt index of from about 0.5 g/10 minutes to about 5.0 g/10 minutes, preferably of from about 0.8 g/10 minutes to about 4.0 g/10 minutes, and a high load melt index (HLMI) of from about 11 g/10 minutes to about 200 g/10 minutes. The melt index of a polymer varies inversely with its molecular weight and is a function of the polymerization temperature of the reaction, the density of the polymer, and the hydrogen/monomer ratio in the reaction system. Thus, the melt index is raised by increasing the polymerization temperature, by decreasing the density of the polymer, and/or by increasing the hydrogen/monomer ratio. In addition to hydrogen, other chain transfer agents may also be used to further increase the melt index of the polymers.

The ethylene copolymers produced with the catalyst compositions of the present invention have a melt flow ratio (MFR) of from about 22 to about 32, preferably of from about 25 to about 30. Melt flow ratio is another means of indicating the molecular weight distribution (Mw/Mn) of a polymer. An MFR in the range of from about 22 to about 32 corresponds to a Mw/Mn of from about 2.7 to about 4.1, and an MFR in the range of from about 25 to about 30 corresponds to a Mw/Mn of from about 2.8 to about 3.6.

The copolymers produced with the catalyst compositions of the present invention have a residual catalyst content, in terms of parts per million of titanium metal, of less than 10 parts per million (ppm) at a productivity level of at least 100,000 pounds of polymer per pound of titanium. The copolymers are readily produced with such catalyst compositions at productivities of up to about 500,000 pounds of polymer per pound of titanium.

The copolymers produced with the catalyst compositions of the present invention are granular materials having an average particle size of the order of from about 0.02 to about 0.05 inches, usually of from about 0.02 to about 0.04 inches, in diameter. The particle size is important for the purpose of readily fluidizing the polymer particles in the fluid bed reactor, as described below. These granular materials also have a low level of fines (no greater than 4.0 percent of the total polymer product) and these fines are no greater than 0.005 inches in diameter.

The copolymers produced with the catalyst compositions of the present invention have a bulk density of from about 19 pounds per cubic foot to about 31 pounds per cubic food.

Catalyst Preparation: Formation of Precursor

The precursor composition employed in the present invention is formed by dissolving at least one titanium compound and at least one magnesium compound in at least one electron donor compound and at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound. After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mol to about 10 mols, of the magnesium compound(s) are used per mol of the titanium compound(s) in preparing the catalyst compositions of the present invention.

The titanium compound(s) employed in preparing the precursor composition has the structure $$Ti(OR)_a X_b$$

wherein
R is an aliphatic or aromatic hydrocarbon radical containing from 1 to 14 carbon atoms, or COR' where R' is an aliphatic or aromatic hydrocarbon radical containing from 1 to 14 carbon atoms,
X is selected from the group consisting of Cl, Br, I, and mixtures thereof,
a is 0, 1 or 2, b is 1 to 4 inclusive, and $a+b=3$ or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound(s) employed in preparing the precursor composition has the structure $$MgX_2$$

wherein X is selected from the group consisting of CL, Br, I, and mixtures thereof.

Suitable magnesium compounds include $MgCl_2$, $MgBr_2$ and $MgI_2$. Anhydrous $MgCL_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cyclic ethers containing from 3 to 4 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyl acetate, butyl acetate, ethyl ether, tetrahydrofuran, dioxane, acetone and methyl ethyl ketone.

Catalyst Preparation: Treatment of Silica Support with Dialkylzinc Compound

In order to obtain ethylene copolymers having improved resistance to pinstriping and gel streaking when extruded into film, it is necessary to disperse the dialkylzinc compound on the silica support employed in the present invention and effect reaction between the zinc compound and the hydroxyl groups on the surface of the support before the zinc compound is brought into contact with the precursor composition. This procedure not only results in the uniform dispersion of the zinc compound on the support, and ultimately throughout the copolymer formed during the polymerization, but also prevents undesirable reaction between the zinc compound and the precursor composition. If the dialkylzinc compound is added to the precursor composition after the precursor composition has been diluted with the support, the desired improvement in pinstriping and gel streaking properties is not obtained. Thus, addition of a dialkylzinc compound during polymerization, as is sometimes done to control molecular weight, is ineffective in improving pinstriping and gel streaking properties. Likewise, treating the precursor composition with the dialkylzinc compound after the precursor composition has been diluted with the support, but before the diluted precursor composition is introduced into the polymerization reactor, does not produce the desired improvement in these properties.

Treatment of the silica support with the dialkylzinc compound can be effected by dissolving the dialkylzinc compound in an inert liquid solvent and applying the resulting solution to the support in any convenient manner, e.g., by simply slurrying the support in the solution. Among the solvents which can be employed to dissolve the dialkylzinc compound are hydrocarbon solvents such as isopentane, hexane, heptane, toluene, xylene and naphtha. Preferably, such solvents are employed together with an amount of dialkylzinc compound such that the resulting solution will contain from 1 percent by weight to 20 percent by weight, preferably from 1 percent by weight to 5 percent by weight, of the dialkylzinc compound.

Usually treatment of the silica support with the dialkylzinc compound is effected at room temperature. However, if desired, treatment can be effected at any temperature from about −30° C. up to the boiling point of the solution employed. In any event, the silica support should be allowed to absorb a sufficient amount of a sufficiently concentrated dialkylzinc solution such that it will contain, after drying, from at least 5 percent by weight to 15 percent by weight, preferably from 6 percent by weight to 8 percent by weight, of the dialkylzinc compound.

The dialkylzinc compounds that can be employed to treat the silica support have the structure $ZnR''R'''$ wherein R" and R'" are alkyl radicals, which radicals may be the same or different. Generally R" and R'" are alkyl radicals containing from 1 to 12 carbon atoms, usually from 1 to 6 carbon atoms. Such radicals may be cyclic, branched or straight chain, and may be substituted with any substituent which is inert to all the components of the catalyst composition and to all the other active components of the reaction system. Illustrative of such radicals are methyl, ethyl, n-propyl, isopropyl, n-butyl, tert-butyl, n-hexyl, cyclohexyl, n-octyl, n-decyl and the like.

The dialkylzinc compounds can be used individually or in combination thereof, and include compounds such as dimethylzinc, diethylzinc, di-n-propylzinc, diisopropylzinc, di-n-butylzinc, di-tert-butylzinc, di-n-hexylzinc, dicyclohexylzinc, di-n-octylzinc and di-n-decylzinc. Diethylzinc is particularly preferred.

The silica employed as support in the present invention should have an average particle size of from about 10 microns to about 250 microns, and a surface area of at least 3 square meters per gram. Preferably the silica employed has an average particle size of from about 20 microns to about 150 microns, and a surface area of at least 50 square meters per gram. Catalyst activity or productivity can apparently be improved by employing a silica support having an average pore size of at least 80 Angstrom units, preferably at least 100 Angstrom units. The support should be dry, that is, free of absorbed water. Drying of the support can be effected by heating, e.g., at a temperature of at least 200° C.

Catalyst Preparation: Dilution of Precursor With Support

The precursor composition is then diluted with the treated silica support by (1) mechanically mixing or (2) impregnating such composition into the support.

Mechanical mixing of the treated support and precursor composition is effected by blending these materials together using conventional techniques. The blended mixture suitably contains from about 3 percent by weight to about 50 percent by weight of the precursor composition.

Impregnation of the treated silica support with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

When thus made as disclosed above the blended or impregnated precursor composition has the formula $Mg_mTi(OR)_nX_p[ED]_q$ wherein
R is an aliphatic or aromatic hydrocarbon radical containing from 1 to 14 carbon atoms, or COR' wherein R' is also an aliphatic or aromatic hydrocarbon radical containing from 1 to 14 carbon atoms,
X is selected from the group consisting of Cl, Br, I, and mixtures thereof,
ED is an electron donor compound,
m is 0.5 to 56, preferably 1.5 to 5,
n is 0, 1 or 2,
n is 2 to 116, preferably 6 to 14, and
q is 2 to 85, preferably 3 to 10.

Suitably, the impregnated silica support contains from about 3 percent by weight to about 50 percent by weight, preferably from about 10 percent by weight to about 30 percent by weight, of the precursor composition.

Activation of Precursor Composition

To be useful in producing ethylene copolymers, the precursor composition must be activated with a compound capable of transforming the titanium atoms in the precursor composition to a state which will cause ethylene to effectively copolymerize with higher alpha olefins. Such activation is effected by means of an organoaluminum compound having the structure $Al(R'''')_dX'_3H_f$ wherein X' is CL or OR''''', R'''' and R''''' are saturated hydrocarbon radicals containing from 1 to 14 carbon atoms, which radicals may be the same or different, e is 0 to 1.5, f is 0 or 1, and d+e+f=3.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{19})_3$.

If desired, the precursor composition may be partially activated before it is introduced into the polymerization reactor. However, any activation undertaken outside of the polymerization reactor should be limited to the addition of an amount of activator compound which does not raise the molar ratio of activator compound:electron donor in the precursor composition beyond 1.4:1. Preferably, when activation is effected outside the reactor in this manner, the activator compound is employed in an amount which will provide the precursor composition with an activator compound:electron donor molar ratio of from about 0.1:1 to about 0.8:1. Such partial activation is preferably carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization reactor where the activation is completed with additional activator compound which can be the same or a different compound.

Alternatively, activation of the precursor composition may be completed entirely inside the polymerization reactor without any prior activation outside of the reactor.

The partially activated or totally unactivated precursor composition and the required amount of activator compound necessary to complete activation of the precursor composition are preferably fed to the reactor through separate feed lines. The activator compound may be sprayed into the reactor in the form of a solution thereof in a hydrocarbon solvent such as isopentane, hexane, or mineral oil. This solution usually contains from about 2 to about 30 weight percent of the activator compound. The activator compound is added to the reactor in such amounts as to provide, in the reactor, a total aluminum:titanium molar ratio of from about 10:1 to about 400:1, preferably from about 25:1 to about 60:1.

In a continuous gas phase process, such as the fluid bed process disclosed below, discrete portions of the partially activated or totally unactivated precursor composition are continuously fed to the reactor, with discrete portions of the activator compound needed to complete the activation of the partially activated or totally unactivated precursor composition, during the continuing polymerization process in order to replace active catalyst sites that are expended during the course of the reaction.

The Polymerization Reaction

The polymerization reaction is conducted by contacting a stream of the monomers, in a gas phase process, such as in the fluid bed process described below, and substantially in the absence of catalyst poisons such as moisture, oxygen, carbon monoxide, carbon dioxide, and acetylene with a catalytically effective amount of the completely activated precursor composition (the catalyst) at a temperature and at a pressure sufficient to initiate the polymerization reaction.

In order to obtain the desired copolymers, no more than 10 mol percent of any higher alpha olefin should be copolymerized with the ethylene monomer. For this reason, no more than 50 mol percent of such alpha olefin should be present in the recycled gas stream of monomers in the reactor.

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles, and a minor amount of catalyst particles fluidized by the continuous flow of polymerizable and modifying gaseous components in the form of make-up feed and recycle gas through the reaction zone. To maintain a viable fluidized bed, the superficial gas velocity through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated or totally unactivated precursor composition used in the fluidized bed is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possibly free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. At that point there is a gas distribution plate 8 above the point of return to aid in fluidizing the bed.

The portion of the gas steam which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles, as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen is used as a chain transfer agent in the polymerization reaction of the present invention. The ratio of hydrogen/ethylene employed will vary between 0.1 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 through line 12.

It is essential to operate the fluid bed reactor at a temperature below the sintering temperature of the polymer particles to insure that sintering will not occur. To produce the desired copolymers, an operating temperature of from about 30° C. to about 105° C. is preferred, most preferably from about 75° C. to about 95° C. Temperatures of from about 75° C. to about 95° C. are used to prepare copolymers having a density of from about 0.91 g/cm$^3$ to about 0.92 g/cm$^3$, while temperatures of from about 80° C. to about 100° C. are used to prepare copolymers having a density of from about 0.92 g/cm$^3$ to about 0.94 g/cm$^3$.

The fluid bed reactor is operated at pressures of up to about 1000 psi, and is preferably operated at a pressure of from about 100 psi to about 300 psi, with operation at the higher pressures in such ranges favoring heat transfer since an increase in pressure increases the unit volume heat capacity of the gas.

The partially activated or totally unactivated precursor composition is injected into the bed at a rate equal to its consumption at a point 13 which is above the distribution plate 8. Preferably, the precursor composition is injected at a point in the bed where good mixing of polymer particles occurs. Injecting the precursor composition at a point above the distribution plate is an important feature of this invention. Since the catalyst formed from such precursor composition is highly active, injection of the precursor composition into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the precursor composition into the reactor above the bed may result in excessive catalyst carryover into the recycle line where polymerization may begin and plugging of the line and heat exchanger may eventually occur.

A gas which is inert to the catalyst, such as nitrogen or argon, is used to carry the partially activated or totally unactivated precursor composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards and downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continually withdrawn at a point 14 at or close to the distribution plate 8 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of times valves 15 and 16 defining a segregation zone 17. While value 16 is closed, value 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 9, heat exchanger 10) should be smooth surfaced, and devoid of unnecessary obstructions so as not to impede the flow of recycle gas.

The feed stream of gaseous monomers polymerizes to produce copolymer at a space time yield of about 2 to 10 pounds/hour/cubic foot of bed volume.

The following Examples are designed to illustrate the process of the present invention and are not intended as a limitation upon the scope thereof.

The properties of the polymers produced in the Examples were determined by the following test methods:

| | |
|---|---|
| Density | ASTM D-1505 — A plaque is made and conditioned for one hour at 100° C. to approach equilibrium crystallinity. Measurement for density is then made in a density gradient column and density values are reported as grams/cm$^3$. |
| Melt Index (MI) | ASTM D-1238 — Condition E — Measured at 190° C. — reported as grams per 10 minutes. |
| Flow Index (HLMI) | ASTM D-1238 — Condition F — Measured at 10 times the weight used in the melt index test above. |
| Melt Flow Ratio (MFR) = | $\frac{\text{Flow Index}}{\text{Melt Index}}$ |
| Productivity | A sample of the resin product is ashed, and the weight % of ash is determined; since the ash is essentially composed of the catalyst, the productivity is thus the pounds of polymer produced per pound of total catalyst consumed. The amount of Ti, Mg, and halide in the ash are determined by elemental analysis. |
| Bulk Density | ASTM D-1895 Method B. The resin is poured via ⅜" diameter funnel into a 400 ml graduated cylinder to 400 ml line without shaking the cylinder, and weighed by difference. |
| Pinstriping and Gel Streaking | Extruded film samples 0.0015 inches thick are examined visually for the presence of pinstriping and gel streaking. The samples are rated from 0 to 3 as follows:<br>0 — free of pinstriping/gel streaking<br>1 — pinstriping/gel streaking<br>2 — moderate pinstriping/gel streaking<br>3 — severe pinstriping/gel streaking. |

EXAMPLE 1

Treatment of Support with Diethylzinc

Five hundred grams (500 g) of silica was dehydrated by heating at a temperature of 800° C. and slurried in 3 liters of isopentane. The slurry was stirred while 142 ml. of a 20 percent by weight solution of diethylzinc in hexane was added thereto over a ¼ hour period. The resulting mixture was then dried under a nitrogen purge at 60° C. over a period of about 4 hours to provide a dry, free-flowing powder containing 3.2 percent by weight of the diethylzinc.

The procedure was repeated several times employing larger amounts of the diethylzinc solution so as to provide silica containing from 6.0 percent by weight to 7.7 percent by weight of the zinc compound.

EXAMPLE 2

Impregnation of Support with Precursor

In a 12 liter flask equipped with a mechanical stirrer were placed 41.8 g (0.439 mol) of anhydrous $MgCl_2$ and 2.5 liters of tetrahydrofuran (THF). To this mixture, 27.7 g (0.146 mol) of $TiCl_4$ were added dropwise over a ¼ hour period. The mixture was then heated at 60° C. for another ½ hour in order to completely dissolve the material.

The diethylzinc-treated silica prepared in accordance with Example 1 was then added to the solution prepared as above. The resulting slurry was stirred for ¼ hour and then dried under a nitrogen purge at 60° C. over a period of about 4 hours to provide a dry, impregnated, free-flowing powder.

EXAMPLE 3

Preparation of Partially Activated Precursor

The silica-impregnated precursor composition prepared in accordance with Example 2 was slurried in 3 liters of anhydrous isopentane and stirred while a 20 percent by weight solution of tri-n-hexylaluminum in anhydrous hexane was added thereto over a ¼ hour period. The tri-n-hexylaluminum solution was employed in an amount sufficient to provide 0.8 mols of aluminum per mol of tetrahydrofuran in the precursor. After addition of the tri-n-hexylaluminum was completed, stirring was continued for an additional ¼ hour. The mixture was then dried under a nitrogen purge at a temperature of 65°±10° C. over a period of about 4 hours to provide a dry, free-flowing powder. This material was stored under dry nitrogen until it was needed.

EXAMPLE 4-8

Ethylene was copolymerized with butene-1 in a series of five experiments employing the fluid bed reaction system described and illustrated herein. The polymerization reactor had a lower section 10 feet high and 13½ inches in diameter, and an upper section 16 feet high and 23½ inches in diameter.

Each of the polymerization reactions was conducted for 24 hours at 85° C. under a pressure of 300 psig, a superficial gas velocity of 1.5 feet/second, and a space time yield between 6 and 10 pounds/hour/cubic foot of bed volume. Hydrogen was introduced into the reactor in each instance as a chain transfer agent to control the molecular weight of the copolymers.

In the first four polymerizations (Examples 4–7), silica-impregnated precursor composition prepared in accordance with Example 2, and partially activated in accordance with Example 3, was fed to the polymerization reactor along with a 5 percent by weight solution of triethylaluminum in isopentane so as to provide a completely activated catalyst in the reactor having an aluminum:titanium molar ratio of 30.1 to 50.1. In each instance, the silica upon which the precursor was impregnated had been previously treated with diethylzinc as described in Example 1. The diethylzinc loading on the silica varied from 3.2 percent by weight to 7.7 percent by weight.

In the next polymerization (Example 8), for comparative purposes, the silica support employed was pretreated with triethylaluminum instead of diethylzinc. The procedure of Example 1 was followed to provide a triethylaluminum loading on the silica of 4 percent by weight. The treated carrier was then impregnated with the precursor composition as in Example 2 and partially activated as in Example 3.

Table I below summarizes the manner in which the silica was pretreated before it was impregnated with the precursor composition, the reaction conditions employed in each polymerization, the productivity of each catalyst system employed in terms of residual ash in the copolymers, the properties of the copolymers produced by these polymerizations, and the pinstriping/gel streaking properties of films produced from such copolymers.

All film samples were prepared from copolymers dry blended with 0.02 percent by weight of tetrakis[methylene 3-(3'5'-di-t-butyl-4'-hydroxyphenyl)propionate]methane as anti-oxidant. In each instance a sample 0.0015 inch thick was produced by extruding the mixture through a 0.0060 inch die gap at a blow-up ratio of 2:1. The extruder was fitted with a 3 inch diameter spiral die and had a 1.5 inch diameter screw which was rotated at 50 rpm. Copolymer resin was fed to the extruder at a rate of 23 pounds per hour. The melt temperature was 210° C. and the frostline of the film was 9-11 inches. The film samples were examined for pinstriping/gel streaking after 45 minutes of extrusion.

As can be seen from the data presented in Table I, by pretreating the support for the catalyst precursor composition with a dialkylzinc compound before it is impregnated with the precursor, it is possible to produce copolymers which can be extruded into films having reduced pinstriping and gel streaking. While slight pinstriping and gel streaking were observed in the polymers produced employing supports containing 3.2 weight percent of diethylzinc, no pinstriping or gel streaking were observed in the copolymers produced employing supports containing at least 6 weight percent of diethylzinc.

the support employed in Example 8, i.e., the support was impregnated with 4 percent by weight of triethylaluminum. The treated carrier was then impregnated with the precursor composition as in Example 2 and partially activated as in Example 3 before it was fed into the reactor.

Activation of the precursor composition was completed in the reactor by adding a 5 percent by weight solution of triethylaluminum in isopentane so as to provide a completely activated catalyst in the reactor having an aluminum:titanium molar ratio of 30:1. During the course of the reaction, a 5 percent by weight solution of diethylzinc in isopentane was also added to the reactor in an amount sufficient to maintain the molar ratio of aluminum:zinc at 1:1.

The polymerization was conducted for 24 hours at 85° C. under a pressure of 300 psig, a superficial gas velocity of 1.5 feet/second, and a space time yield of 5 pounds/hour/cubic foot of bed volume. Hydrogen was introduced into the reactor as a chain transfer agent to control molecular weight. The molar ratio of butene-:ethylene was 0.52, and the molar ratio of hydrogen-:ethylene was 0.14.

Film was extruded from the copolymer produced in this manner employing the same procedure employed to extrude the copolymers produced in accordance with Examples 4–8. After 45 minutes of extrusion, pinstriping and gel streaking were observed in the film. The film was given a pinstriping/gel streaking value of 1. The copolymer had a bulk density of 17.0 pounds per cubic foot.

EXAMPLE 10

Ethylene was copolymerized with butene-1 employing the same fluid bed reaction system employed in Examples 4–8.

The silica support employed as carrier for the precursor composition was pretreated in the same manner as

TABLE I

| Example | 4 | 5 | 6 | 7 | 8 |
|---|---|---|---|---|---|
| Pretreatment of Silica Carrier | | | | | |
| Diethylzinc, Wt. % | 3.2 | 6.0 | 6.6 | 7.7 | — |
| Triethylaluminum, Wt. % | — | — | — | — | 4.0 |
| Polymerization Conditions | | | | | |
| Activator | $(C_2H_5)_3Al$ | $(C_2H_5)_3Al$ | $(C_2H_5)_3Al$ | $(C_2H_5)_3Al$ | $(C_2H_5)_3Al$ |
| Temperature, °C. | 85 | 85 | 85 | 85 | 85 |
| Pressure, psig | 300 | 300 | 300 | 300 | 300 |
| Gas Velocity, ft/second | 1.5 | 1.5 | 1.5 | 1.5 | 1.5 |
| Space-Time Yield (lbs/hr/ft$^3$) | 9.5 | 6.7 | 6.4 | 7.0 | 7.0 |
| Butene/Ethylene Mol Ratio | 0.45 | 0.44 | 0.45 | 0.45 | 0.44 |
| Hydrogen/Ethylene Mol Ratio | 0.23 | 0.25 | 0.24 | 0.23 | 0.20 |
| Productivity | | | | | |
| ash in Copolymer | 0.044 | 0.052 | 0.051 | 0.069 | 0.035 |
| Polymer Properties | | | | | |
| Melt Index, g/10 Min | 2.3 | 2.1 | 1.9 | 1.9 | 2.0 |
| Melt Flow Ratio | 26 | 26 | 24 | 24 | 26 |
| Density, g/cm$^3$ | 0.918 | 0.918 | 0.918 | 0.917 | 0.918 |
| Bulk Density, lbs/ft$^3$ | 23.2 | 24.4 | 24.6 | 24.4 | 22.0 |
| Film Properties | | | | | |
| Pinstriping/Gel Streaking | 1 | 0 | 0 | 0 | 3 |

EXAMPLE 9

Ethylene was copolymerized with butene-1 employing the same fluid bed reaction system employed in Examples 4–8.

The silica support employed as carrier for the precursor composition was pretreated in the same manner as the support employed in Example 8, i.e., the support was impregnated with 4 percent by weight of triethylaluminum. The treated carrier was then impregnated with the precursor composition as in Example 2. Following this, the silica-impregnated precursor composition was slurred in 3 liters of anhydrous isopentane and stirred while 400 ml. of a 20 percent by weight solution of diethylzinc in hexane was added thereto over a ¼ hour period. The resulting mixture was then dried under a nitrogen purge at 60° C. over a period of about 4 hours. A dry powder was obtained containing about 12 percent by weight of the diethylzinc.

After treating the silica-impregnated precursor composition with diethylzinc, as described, it was partially activated as in Example 3 and subsequently fed to the polymerization reactor along with a 5 percent by weight solution of triethylaluminum in isopentane so as to provide a completely activated catalyst in the reactor having an aluminum:titanium molar ratio of 30:1.

The polymerization was conducted for 24 hours at 85° C. under a pressure of 300 psig, a superficial gas velocity of 1.5 feet/second, and a space time yield of 6.8 pounds/hour/cubic foot of bed volume. Hydrogen was introduced into the reactor as a chain transfer agent to control molecular weight. The molar ratio of butene-:ethylene was 0.43, and the molar ratio of hydrogen-:ethylene was 0.21.

Film was extruded from the copolymer produced in this manner employing the same procedure employed to extrude the copolymers produced in accordance with Examples 4–8. After 45 minutes of extrusion, pinstriping and gel streaking were observed in the film. The film was given a pinstriping/gel streaking value of 2. The copolymer had a bulk density of 18.6 pounds per cubic foot.

EXAMPLE 11

Ethylene was copolymerized with butene-1 employing the same fluid bed reaction system employed in Examples 4–8.

The silica support employed as carrier for the precursor composition was pretreated in the same manner as the support employed in Example 8, i.e., the support was impregnated with 4 percent by weight of triethylaluminum. The treated carrier was then impregnated with the precursor composition as in Example 2. Following this, the silica-impregnated precursor composition was slurred in 3 liters of anhydrous isopentane and stirred while 400 ml. of a 20 percent by weight solution of diethylzinc in hexane was added thereto over a ¼ hour period. The resulting mixture was then dried under a nitrogen purge at 60° C. over a period of about 4 hours. A dry powder was obtained containing about 12 percent by weight of the diethylzinc.

After treating the silica-impregnated precursor composition with diethylzinc, as described, it was fed to the polymerization reactor along with a 5 percent by weight solution of triethylaluminum in isopentane so as to provide a completely activated catalyst in the reactor having an aluminum:titanium molar ratio of 30:1.

The polymerization was conducted for 24 hours at 85° C. under a pressure of 300 psig, a superficial gas velocity of 1.5 feet/second, and a space time yield of 5.2 pounds/hour/cubic foot of bed volume. Hydrogen was introduced into the reactor as a chain transfer agent to control molecular weight. The molar ratio of butene-:ethylene was 0.52, and the molar ratio of hydrogen-:ethylene was 0.24.

Film was extruded from the copolymer produced in this manner employing the same procedure employed to extrude the copolymers produced in accordance with Examples 4–8. After 45 minutes of extrusion, pinstriping and gel streaking were observed in the film. The film was given a pinstriping/gel streaking value of 2. The copolymer had a bulk density of 16.3 pounds per cubic foot.

What is claimed is:

1. A continuous process for producing ethylene copolymers containing at least 90 mol percent of ethylene and no more than 10 mol percent of one or more alpha olefins containing from 3 to 8 carbon atoms, said copolymers being produced in granular form and having a density of from 0.91 g/cm³ to 0.94 g/cm³,
   which comprises contacting a mixture of ethylene and at least one alpha olefin containing from 3 to 8 carbon atoms, at a temperature of from 30° C. to 105° C. and a pressure no greater than 1000 psi, in a gas phase reaction zone, with particles of a catalyst system comprising a precursor composition having the formula $$Mg_mTi(OR)_nX_p[ED]_q$$

wherein R is an aliphatic or aromatic hydrocarbon radical containing from 1 to 14 carbon atoms, or COR' wherein R' is an aliphatic or aromatic hydrocarbon radical containing from 1 to 14 carbon atoms,
   X is selected from the group consisting of Cl, Br, I, and mixtures thereof,
   ED is an organic electron donor compound selected from the group consisting of alkyl esters of aliphatic and aromatic carboxylic acids, aliphatic ethers, cyclic ethers and aliphatic ketones,
   m is 0.5 to 56,
   n is 0, 1 or 2,
   p is 2 to 116, and
   q is 2 to 85,
   said precursor composition being diluted with a silica support containing from 5 percent by weight to 15 percent by weight of a dialkylzinc compound having the formula $$ZnR''R'''$$

wherein R" and R'" are alkyl radicals containing from 1 to 12 carbon atoms,
   and said precursor composition being completely activated with an organoaluminum activator compound having the formula $$Al(R'''')_dX'_eH_f$$

wherein X' is Cl or OR''''',
   R'''' and R''''' are saturated hydrocarbon radicals containing from 1 to 14 carbon atoms,
   e is 0 to 1.5,
   f is 0 or 1, and
   d+e+f=3,
   said activator compound being employed in an amount such as to provide a total aluminum:titanium molar ratio in said reaction zone of from 10:1 to 400:1.

2. A process as in claim 1 wherein said precursor composition is mechanically mixed with the silica support and the blended mixture contains from 3 percent by weight to 50 percent by weight of the precursor composition.

3. A process as in claim 1 wherein the silica support is impregnated with the precursor composition and the impregnated support contains from 3 percent by weight to 50 percent by weight of the precursor composition.

4. A process, as in claim 1, 2 or 3 wherein X and X' are Cl, [ED] is tetrahydrofuran, n is 0, m is 1.5 to 5, p is 6 to 14, and q is 3 to 10.

5. A process as in claim 4 wherein R" and R'" are alkyl radicals containing from 1 to 6 carbon atoms.

6. A process as in claim 5 wherein the dialkylzinc compound is diethylzinc.

7. A process as in claim 1, 2 or 3 wherein the precursor composition is diluted with a silica support containing from 6 percent by weight to 8 percent by weight of the dialkylzinc compound.

8. A process as in claim 7 wherein X and X' are Cl, [ED] is tetrahydrofuran, n is 0, m is 1.5 to 5, p is 6 to 14, and q is 3 to 10.

9. A process as in claim 8 wherein R" and R'" are alkyl radicals containing from 1 to 6 carbon atoms.

10. A process as in claim 9 wherein the dialkylzinc compound is diethylzinc.

11. A precursor composition suitable as a component of a catalyst composition capable of copolymerizing ethylene with higher alpha olefins under a pressure of less than 1000 psi, said precursor composition having the formula $$Mg_mTi(OR)_nX_p[ED]_q$$

wherein R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cyclic ethers and aliphatic ketones, m is 0.5 to 56,
n is 0, 1 or 2,
p is 2 to 116, and
q is 2 to 85, said precursor composition being diluted with a silica support containing from 5 percent by weight to 15 percent by weight of a dialkylzinc compound having the formula $$ZnR''R'''$$

wherein R" and R'" are alkyl radicals containing from 1 to 12 carbon atoms.

12. A composition as in claim 11 wherein said precursor composition is mechanically mixed with the silica support and the blended mixture contains from 3 percent by weight to 50 percent by weight of the precursor composition.

13. A composition as in claim 11 wherein the silica support is impregnated with the precursor composition and the impregnated support contains from 3 percent by weight to 50 percent by weight of the precursor composition.

14. A composition as in claim 11, 12 or 13 wherein X is CL, [ED] is tetrahydrofuran, n is 0, m is 1.5 to 5, p is 6 to 14, and q is 3 to 10.

15. A composition as in claim 14 wherein R" and R'" are alkyl radicals containing from 1 to 6 carbon atoms.

16. A composition as in claim 15 wherein the dialkylzinc compound is diethylzinc.

17. A composition as in claim 11, 12 or 13 wherein the precursor composition is diluted with a silica support containing from 6 percent by weight to 8 percent by weight of the dialkylzinc compound.

18. A composition as in claim 17 wherein X is Cl, [ED] is tetrahydrofuran, n is 0, m is 1.5 to 5, p is 6 to 14, and q is 3 to 10.

19. A composition as in claim 18 wherein R" and R'" are alkyl radicals containing from 1 to 6 carbon atoms.

20. A composition as in claim 19 wherein the dialkylzinc compound is diethylzinc.

21. A precursor composition as in claim 11, 12 or 13 which has been partially activated with an organoaluminum activator compound having the formula $$Al(R'''')_dX'_eH_f$$

wherein X' is Cl or OR''''',

R'''' and R''''' are saturated hydrocarbon radicals containing from 1 to 14 carbon atoms, e is 0 to 1.5,
f is 0 or 1, and
d+e+f=3, said activator compound being employed in an amount such as to provide the precursor composition with a molar ratio of activator compound:electron donor of up to 1.4:1.

22. A composition as in claim 21 wherein X and X' are Cl, [ED] is tetrahydrofuran, n is 0, m is 1.5 to 5, p is 6 to 14, and q is 3 to 10.

23. A composition as in claim 22 wherein R" and R'" are alkyl radicals containing from 1 to 6 carbon atoms.

24. A composition as in claim 23 wherein the dialkylzinc compound is diethylzinc.

25. A composition as in claim 21 wherein the precursor composition is diluted with a silica support containing from 6 percent by weight to 8 percent by weight of the dialkylzinc compound.

26. A composition as in claim 25 wherein X and X' are Cl, [ED] is tetrahydrofuran, n is 0, m is 1.5 to 5, p is 6 to 14, and q is 3 to 10.

27. A composition as in claim 26 wherein R" and R'" are alkyl radicals containing from 1 to 6 carbon atoms.

28. A composition as in claim 27 wherein the dialkylzinc compound is diethylzinc.

29. A process for preparing a precursor composition suitable as a component of a catalyst composition capable of copolymerizing ethylene with higher alpha olefins under a pressure of less than 1000 psi which comprises (A) forming a precursor composition of the formula $$Mg_mTi(OR)_nX_p[ED]_q$$

wherein R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cyclic ethers and aliphatic ketones, m is 0.5 to 56, n is 0, 1 or 2,
p is 2 to 116, and
q is 2 to 85,
by dissolving a titanium compound and a magnesium compound in a liquid organic electron donor compound so as to form a solution of said precursor composition in said electron donor compound,
said titanium compound having the structure $Ti(OR')_aX_b$ wherein a is 0, 1 or 2, b is 1 to 4 inclusive, and a+b=3 or 4,
said magnesium compound having the structure $MgX_2$,
said titanium compound, said magnesium compound, and said electron donor compound being employed in such amounts as to satisfy the values of m, n, p and q, and (B) diluting said precursor composition with a silica support containing from 5 percent by weight to 15 percent by weight of a dialkylzinc compound having the formula $$ZnR''R'''$$

wherein R'' and R''' are alkyl radicals containing from 1 to 12 carbon atoms.

30. A process as in claim 29 wherein said precursor composition is mechanically mixed with the silica support and the blended mixture contains from 3 percent by weight to 50 percent by weight of the precursor composition.

31. A process as in claim 29 wherein the silica support is impregnated with the precursor composition and the impregnated support contains from 3 percent by weight to 50 percent by weight of the precursor composition.

32. A process as in claim 29, 30 or 31 wherein X is Cl, [ED] is tetrahydrofuran, n is 0, m is 1.5 to 5, p is 6 to 14, and q is 3 to 10.

33. A process as in claim 32 wherein R'' and R''' are alkyl radicals containing from 1 to 6 carbon atoms.

34. A process as in claim 33 wherein the dialkylzinc compound is diethylzinc.

35. A process as in claim 29, 30 or 31 wherein the precursor composition is diluted with a silica support containing from 6 percent by weight to 8 percent by weight of the dialkylzinc compound.

36. A process as in claim 35 wherein X is Cl, [ED] is tetrahydrofuran, n is 0, m is 1.5 to 5, p is 6 to 14, and q is 3 to 10.

37. A process as in claim 36 wherein R'' and R''' are alkyl radicals containing from 1 to 6 carbon atoms.

38. A process as in claim 37 wherein the dialkylzinc compound is diethylzinc.

* * * * *